United States Patent
Lim

(10) Patent No.: US 9,624,874 B2
(45) Date of Patent: Apr. 18, 2017

(54) EXHAUST GAS RECIRCULATION APPARATUS AND CONTROL METHOD THEREFOR

(71) Applicant: Doosan Infracore Co., Ltd., Incheon (KR)

(72) Inventor: Ji Hoon Lim, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 109 days.

(21) Appl. No.: 14/654,754

(22) PCT Filed: Dec. 9, 2013

(86) PCT No.: PCT/KR2013/011350
§ 371 (c)(1),
(2) Date: Jun. 22, 2015

(87) PCT Pub. No.: WO2014/104611
PCT Pub. Date: Jul. 3, 2014

(65) Prior Publication Data
US 2015/0337772 A1 Nov. 26, 2015

(30) Foreign Application Priority Data
Dec. 24, 2012 (KR) .................. 10-2012-0151970

(51) Int. Cl.
*F02M 25/00* (2006.01)
*F02M 25/07* (2006.01)
(Continued)

(52) U.S. Cl.
CPC .......... *F02M 25/074* (2013.01); *F02D 21/08* (2013.01); *F02D 41/005* (2013.01); *F02M 26/05* (2016.02);
(Continued)

(58) Field of Classification Search
CPC ...... F02M 25/074; F02M 26/05; F02M 26/24; F02M 26/25; F02M 26/15; F02M 26/06;
(Continued)

(56) References Cited

U.S. PATENT DOCUMENTS

| | | | | |
|---|---|---|---|---|
| 7,201,121 B2 * | 4/2007 | Weber | ............... | F01L 9/02 123/559.1 |
| 7,252,054 B2 * | 8/2007 | Weber | ............... | F01L 13/0015 123/559.1 |

(Continued)

FOREIGN PATENT DOCUMENTS

| | | |
|---|---|---|
| JP | 2008-303763 A | 12/2008 |
| KR | 100765413 B1 | 10/2007 |

(Continued)

OTHER PUBLICATIONS

International Search Report with English Translation mailed Mar. 5, 2014 for corresponding International Application No. PCT/KR2013/011350, 5 pages.

*Primary Examiner* — Carlos A Rivera
*Assistant Examiner* — Sherman Manley
(74) *Attorney, Agent, or Firm* — John D. Veldhuis-Kroeze; Westman, Champlin & Koehler, P.A.

(57) ABSTRACT

An exhaust gas recirculation apparatus including an engine; a suction line; an exhaust line; a post-processing unit which is disposed in the exhaust line to reduce hazardous substances contained in the exhaust gas; a first circulation line which guides a part of the exhaust gas, which is guided to the exhaust line, to the suction line; a second circulation line which guides a part of the exhaust gas, which is guided to a downstream side of the post-processing unit, to the suction line; and a bypass line which branches off from an upstream side of the second circulation line, and merges with a downstream side of the second circulation line, wherein ammonia slip, which is discharged from the post-processing unit, is prevented from being guided to the suction line.

14 Claims, 3 Drawing Sheets

(51) Int. Cl.

| | |
|---|---|
| *F02D 41/00* | (2006.01) |
| *F02M 26/16* | (2016.01) |
| *F02M 26/05* | (2016.01) |
| *F02M 26/06* | (2016.01) |
| *F02M 26/15* | (2016.01) |
| *F02M 26/25* | (2016.01) |
| *F02M 26/24* | (2016.01) |
| *F02D 21/08* | (2006.01) |
| *F02B 37/00* | (2006.01) |

(52) U.S. Cl.
CPC ............ *F02M 26/06* (2016.02); *F02M 26/15* (2016.02); *F02M 26/16* (2016.02); *F02M 26/24* (2016.02); *F02M 26/25* (2016.02); *F02B 37/00* (2013.01); *F02D 2021/083* (2013.01); *Y02T 10/47* (2013.01)

(58) Field of Classification Search
CPC ....... F02M 26/16; F02D 41/005; F02D 21/08; F02D 2021/083; F02B 37/00; Y02T 10/47
See application file for complete search history.

(56) References Cited

U.S. PATENT DOCUMENTS

| | | | |
|---|---|---|---|
| 2003/0066287 A1* | 4/2003 | Hirota | B01D 53/9431 60/297 |
| 2004/0050375 A1* | 3/2004 | Arnold | F02B 37/18 123/568.12 |
| 2011/0088674 A1 | 4/2011 | Shutty et al. | |
| 2011/0146268 A1* | 6/2011 | Hepburn | F01N 3/021 60/602 |
| 2012/0073265 A1* | 3/2012 | Yeager | F01N 3/106 60/274 |
| 2014/0165560 A1* | 6/2014 | Henry | F02M 26/15 60/605.2 |
| 2014/0283765 A1* | 9/2014 | Naito | F01P 3/12 123/41.09 |
| 2015/0107564 A1* | 4/2015 | Itoh | F02B 37/04 123/559.2 |

FOREIGN PATENT DOCUMENTS

| | | |
|---|---|---|
| KR | 10-2008-0005370 A | 1/2008 |
| WO | 2012120347 A1 | 9/2012 |

* cited by examiner

EXHAUST GAS RECIRCULATION APPARATUS AND CONTROL METHOD THEREFOR

CROSS-REFERENCE TO RELATED APPLICATION

This Application is a Section 371 National Stage Application of International Application No. PCT/KR2013/011350, filed Dec. 9, 2013 and published, not in English, as WO 2014/104611 on Jul. 3, 2014.

FIELD OF THE DISCLOSURE

The present disclosure relates to an exhaust gas recirculation apparatus and a method of controlling the exhaust gas recirculation apparatus. In particular, the present disclosure relates to an exhaust gas recirculation apparatus for a diesel engine, which is designed to provide a high rate of removal of a nitrogen oxide and minimize inflow of ammonia slip, and a method of controlling the exhaust gas recirculation apparatus.

BACKGROUND OF THE DISCLOSURE

In general, exhaust gas discharged from a diesel engine contains a nitrogen oxide (NOx), and the nitrogen oxide is discharged into the atmosphere and causes air pollution.

Therefore, the diesel engine is provided with an exhaust gas recirculation (hereinafter, referred to as EGR) apparatus that reduces hazardous substances contained in the exhaust gas and circulates a part of the exhaust gas to suctioned air in the engine.

Patent Literature 1 discloses an exhaust gas recirculation apparatus having multiple passages provided in an engine system, and the exhaust gas recirculation apparatus is provided with an EGR sub-system having the multiple passages for recirculating a part of the exhaust gas discharged from the engine system from an exhaust sub-system to a suction sub-system in order to combust the part of the exhaust gas again in the engine.

The aforementioned EGR sub-system is characterized by being provided with two or more EGR passages including, for example, a high-pressure (HP) EGR passage and a low-pressure (LP) EGR passage provided in the engine system.

The aforementioned related art does not show a method of preventing ammonia (NH3) slip from flowing into the suction sub-system in a case in which unexpected ammonia slip occurs in a selective catalytic reduction (SCR) device in the engine system.

When the ammonia slip flows into the suction sub-system, the ammonia slip corrodes a compressor that is made of aluminum and rotated at a high speed. As widely known to those skilled in the art, the corroded compressor acts as a crucial factor that makes it impossible for an electronic control unit (ECU) to produce desired target boost pressure when the electronic control unit controls boost pressure in order to adjust an amount of air.

The corrosion, which will occur in the engine system, also has an adverse effect on an amount of EGR, and consequently, there is a problem in that the engine cannot be effectively controlled.

LITERATURE OF RELATED ART

Patent Literature (Patent Literature 1) International Publication No. WO 2009/148917

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter.

Accordingly, the present disclosure has been made in an effort to solve the aforementioned problem, and an object of the present disclosure is to prevent ammonia slip in an exhaust gas recirculation apparatus from flowing into an intake manifold.

In order to achieve the aforementioned object, a first exemplary embodiment of the present disclosure relates to an exhaust gas recirculation apparatus which prevents ammonia slip discharged from a post-processing unit from flowing into a suction line, and the exhaust gas recirculation apparatus includes: an engine; the suction line which is connected to the engine to supply suctioned air; an exhaust line which is connected to the engine to discharge exhaust gas to the outside; the post-processing unit which is disposed in the exhaust line to reduce hazardous substances contained in the exhaust gas; a first circulation line which guides a part of the exhaust gas, which is guided to the exhaust line, to the suction line; a second circulation line which re-guides a part of the exhaust gas, which is guided to a downstream side of the post-processing unit, to the suction line; and a bypass line which branches off from an upstream side of the second circulation line, and merges with a downstream side of the second circulation line.

Specifically, the second circulation line of the exhaust gas recirculation apparatus according to the first exemplary embodiment of the present disclosure is in communication with the exhaust line at the downstream side of the post-processing unit and the suction line.

The bypass line according to the present disclosure is further provided with an ammonia oxidation catalyst device, thereby oxidizing and removing the ammonia slip.

In the present disclosure, an EGR cooler is further disposed at a downstream side of a portion where the bypass line and the second circulation line merge together.

In the present disclosure, a first branch valve is provided at a portion where the second circulation line and the exhaust line merge together, thereby controlling a passage of the exhaust gas.

In the present disclosure, a second branch valve is provided at a portion where the second circulation line and the bypass line merge together, thereby guiding the exhaust gas containing the ammonia slip to the bypass line.

Preferably, the post-processing unit includes a selective catalytic reduction (SCR) device.

A second exemplary embodiment of the present disclosure relates to an exhaust gas recirculation apparatus which prevents ammonia slip discharged from a post-processing unit from flowing into a suction line, and the exhaust gas recirculation apparatus includes: an engine; the suction line which is connected to the engine to supply suctioned air; an exhaust line which is connected to the engine to discharge exhaust gas to the outside; the post-processing unit which is disposed in the exhaust line to reduce hazardous substances contained in the exhaust gas; a first circulation line which guides a part of the exhaust gas, which is guided to the exhaust line, to the suction line; a second circulation line which guides a part of the exhaust gas, which is guided to a downstream side of the post-processing unit, to the suction line; and a bypass line which branches off from the exhaust line at an upstream side of a portion where the second circulation line and the exhaust line merge together, and merges with the second circulation line.

The second circulation line of the exhaust gas recirculation apparatus according to the second exemplary embodiment of the present disclosure is in communication with the exhaust line at the downstream side of the post-processing unit and the suction line.

The bypass line according to the present disclosure is further provided with an ammonia oxidation catalyst device, thereby oxidizing and removing the ammonia slip.

In the present disclosure, an EGR cooler is further disposed at a downstream side of a portion where the bypass line and the second circulation line merge together.

In the present disclosure, a first branch valve is provided at a portion where the second circulation line and the exhaust line merge together.

In the present disclosure, a second branch valve is provided at a portion where the bypass line and the exhaust line merge together, thereby guiding the exhaust gas containing the ammonia slip to the bypass line.

Preferably, the post-processing unit includes a selective catalytic reduction (SCR) device.

A method of controlling an exhaust gas recirculation apparatus according to the present disclosure includes: determining supply of a large amount of EGR in the exhaust gas recirculation apparatus; supplying the EGR; determining possibility of ammonia slip in the exhaust gas recirculation apparatus; and guiding the ammonia slip to an ammonia oxidation catalyst device.

When the possibility of the ammonia slip is equal to or greater a critical value for evaluating the occurrence of the ammonia slip in the determining of the possibility of the ammonia slip, the exhaust gas recirculation apparatus recognizes that the possibility of the occurrence of the ammonia slip is significantly high.

Here, the critical value for evaluating the occurrence of the ammonia (NH3) slip is $((a \times X)+(b \times Y))/(c \times Z)$, in which a, b, and c are weight factors, X is a flow velocity of exhaust gas, Y is a rate of change in the occurrence of ammonia, and Z is a rate of adsorbing ammonia of an SCR carrier.

First of all, terms or words used in the specification and the claims should not be interpreted as a general and dictionary meaning and should be interpreted as a meaning and a concept which conform to the technical spirit of the present disclosure based on a principle that an inventor can appropriately define a concept of a term in order to describe his/her own invention by the best method.

According to the aforementioned description of the present disclosure, the present disclosure is provided to prevent ammonia slip, which is unnecessarily exposed from the post-processing unit of the exhaust gas recirculation apparatus, specifically, from the selective catalytic reduction (SCR) device, from flowing into the intake manifold.

The present disclosure may prevent the inflow of the ammonia slip just by additionally mounting the bypass line and the ammonia oxidation catalyst (AOC) device without changing the LP circulation line in the related art which is in communication with the suction line and the exhaust line for the EGR.

The present disclosure, which has the aforementioned structure, may minimize contact with ammonia and improve durability without causing corrosion inside the engine.

DESCRIPTION OF MAIN REFERENCE NUMERALS OF THE DRAWINGS

Figure 1:
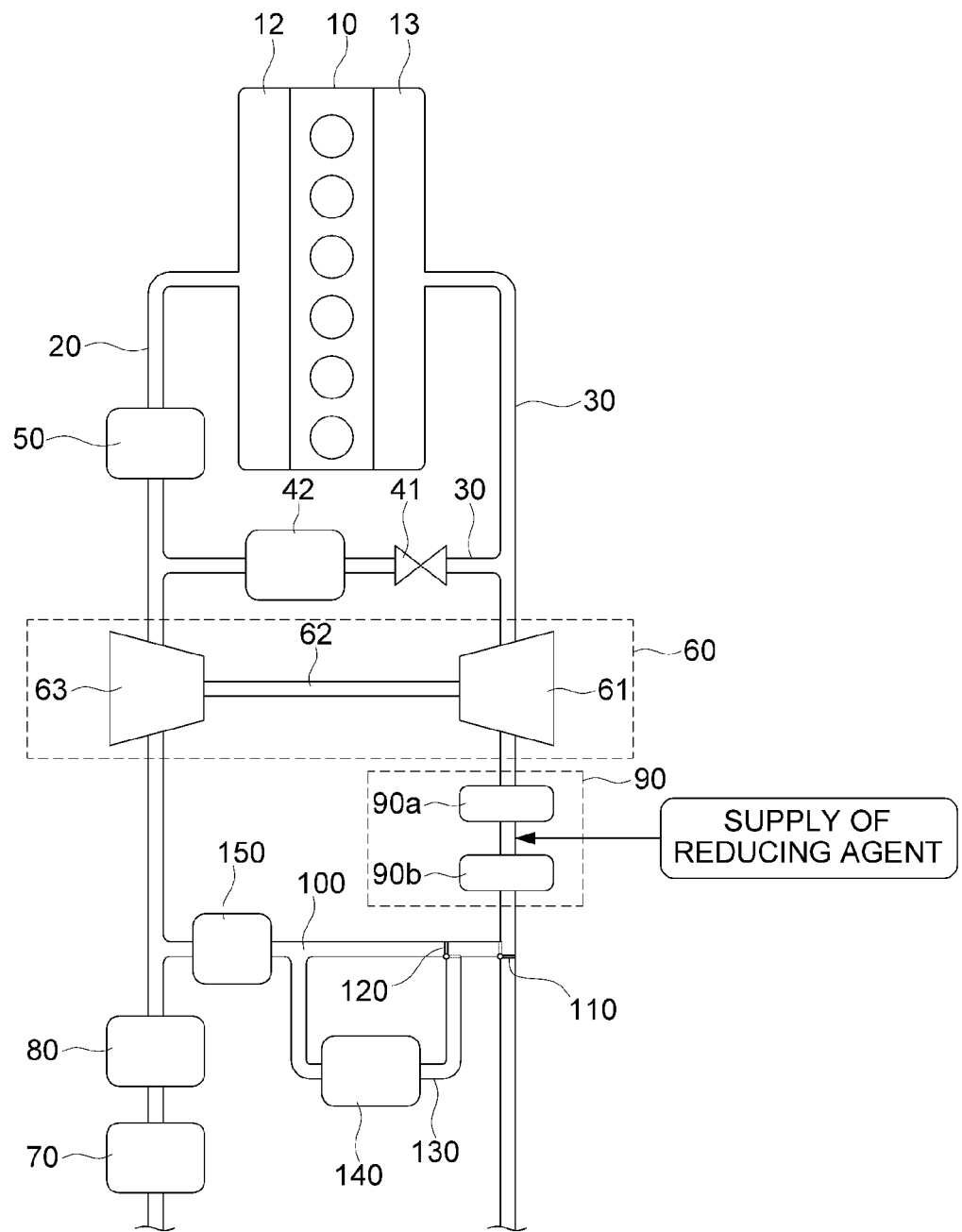
FIG. 1 is a schematic configuration diagram of an exhaust gas recirculation apparatus according to a first exemplary embodiment of the present disclosure.

10: Engine
20: Suction line
30: Exhaust line
40, 100: First circulation line
60: Turbocharger
70: Air cleaner
90: Post-processing unit
110: First branch valve
120, 120': Second branch valve,
130, 130': Bypass line
140: AOC

DETAILED DESCRIPTION

Advantages and features of the present disclosure and methods of achieving the advantages and features will be clear with reference to exemplary embodiments described in detail below together with the accompanying drawings.

Like reference numerals indicate like elements throughout the specification, like reference numerals refer to constituent elements identical to those in the related art, and a detailed description thereof will be omitted.

Meanwhile, the terms used in the description are defined considering the functions of the present disclosure and may vary depending on the intention or usual practice of a manufacturer. Therefore, the definitions should be made based on the entire contents of the present specification.

FIG. 1 is a schematic configuration diagram of an exhaust gas recirculation apparatus according to a first exemplary embodiment of the present disclosure.

The exhaust gas recirculation apparatus includes an engine 10, a suction line 20, an exhaust line 30, a first circulation line 40, a second circulation line 100, a turbocharger 60, and a post-processing unit 90, and serves to recirculate exhaust gas to the engine 10 to allow the exhaust gas to be combusted in the engine 10 in order to reduce hazardous substances contained in the exhaust gas that will be discharged from the engine, particularly, a diesel engine.

The suction line 20 is connected to an intake manifold 12 of the engine 10 to provide suctioned air, and the exhaust line 30 is connected to an exhaust manifold 13 of the engine to discharge the exhaust gas to the outside.

As illustrated, an air cleaner 70, a compressor 63, and an intercooler 50 are disposed in the suction line 20. In addition, in the present disclosure, a sensor 80 capable of controlling an amount of air flowing into the air cleaner 70 may be further provided in the suction line 20.

The turbocharger 60 includes a turbine 61, a shaft 62, and the compressor 63, and the turbine 61 and the compressor 63 are connected by the shaft 62. The turbine 61 is disposed in the exhaust line 30, and the compressor 63 is disposed in the suction line 20. When the turbine 61 is operated by a flow of the exhaust gas, the turbine 61 transmits power through the shaft 62, and operates the compressor 63. The compressor 63 compresses the suctioned air to increase an amount of suctioned air.

In addition, the intercooler 50 is disposed at an outlet of the turbocharger 60 in the suction line 20. The intercooler 50 decreases a temperature of the suctioned air to increase the mass of air with respect to the same volume, thereby increasing an amount of oxygen. Accordingly, an appropriate mixture ratio of air to fuel is implemented in the engine 10, thereby increasing combustion efficiency and improving output of the engine.

The suction line 20 and the exhaust line 30 are in communication with the first circulation line 40 and the second circulation line 100. A part of the exhaust gas discharged from the exhaust manifold 13 is selectively guided to the suction line 20 via the first circulation line 40 or the second circulation line 100. A part of the exhaust gas, which is guided to the first circulation line 40 or the second circulation line 100, is mixed with clean air to be supplied to the air cleaner 70, and the mixed air is supplied to the engine 10 through the intake manifold 12.

The first circulation line 40 or a high-pressure (HP) circulation line is provided with an HP EGR valve 41 and an EGR cooler 42. Optionally, the first circulation line 40 is disposed at a front end of the intercooler 50, which prevents high-temperature exhaust gas flowing into the first circulation line 40 from increasing a load on the intercooler 50. The EGR valve 41 controls a flow rate of the exhaust gas to be recirculated, and the EGR cooler 42 cools the high-temperature exhaust gas to a low temperature.

The second circulation line 100 or a low-pressure (LP) circulation line is provided with a first branch valve 110, a second branch valve 120, and a bypass line 130. Preferably, an upper end of the second circulation line 100 is connected to be in fluid communication with the turbine 61 at a downstream side of the post-processing unit 90, and a lower end of the second circulation line 100 is connected to be in fluid communication with the suction line 20 between the air cleaner 70 and the compressor 63, such that low-pressure exhaust gas and filtered clean air may be mixed together. The passage of exhaust gas is restricted by the first branch valve 110 so that the exhaust gas, which is guided to the downstream side of the post-processing unit 90, may be recirculated through the second circulation line 100 according to the present disclosure. The exhaust gas recirculation apparatus according to the present disclosure has the bypass line 130 that branches off from the second circulation line 100, and the bypass line 130 is provided with an ammonia oxidation catalyst device 140 (hereinafter, referred to as AOC (ammonia oxidation catalyst)). Specifically, the bypass line 130 branches off from an upstream side of the second circulation line 100, and merges with a downstream side of the second circulation line 100, and the bypass line 130 is opened and closed by means of the second branch valve 120. That is, the recirculating exhaust gas is controlled so as to flow into one line of the second circulation line 100 and the bypass line 130 by means of the second branch valve 120.

Optionally, the second circulation line 100 may be further provided with an EGR cooler 150 that cools the exhaust gas to be guided to the second circulation line 100, and the EGR cooler 150 may be provided at a rear end of a portion where the second circulation line 100 and the bypass line 130 merge together.

The post-processing unit 90 includes a diesel oxidation catalyst device 90a (hereinafter, DOC), an SCR 90b, and a diesel particulate filter unit (DPF), and ammonia slip may occur at a downstream side of the SCR 90b.

The present disclosure is characterized by preventing the ammonia slip from flowing into the engine 10 through the suction line 20. In the exhaust gas recirculation apparatus of the present disclosure, the ammonia slip may occur under the following situations. (1) In a case in which an amount of NOx expected by the ECU (not illustrated) is larger than a discharge amount of NOx actually discharged from the engine, an amount of ammonia, which is larger than an amount of ammonia that stoichiometrically reacts with NOx in the SCR, is supplied, and as a result, the ammonia slip occurs. (2) In a case in which an amount of reducing agent, which is equal to or larger than required, is supplied to the SCR due to malfunction of a valve that supplies the reducing agent such as urea or ammonia, the ammonia slip may occur. (3) An amount of ammonia stored in a carrier of the SCR and an amount of NOx discharged from the engine need to be taken into consideration, and in a case in which a relatively large amount of reducing agent (ammonia) is supplied due to deterioration in efficiency of the carrier, the ammonia slip occurs.

The ammonia slip, which is discharged to the downstream side of the SCR as described above, is guided to the second circulation line 100 through the first branch valve 110, and guided to the bypass line 130 through the second branch valve 120. The ammonia slip is removed by being oxidized at the AOC 140 in the bypass line 130. The exhaust gas from which the ammonia has been removed is guided and recirculated to the engine 10.

Figure 2:
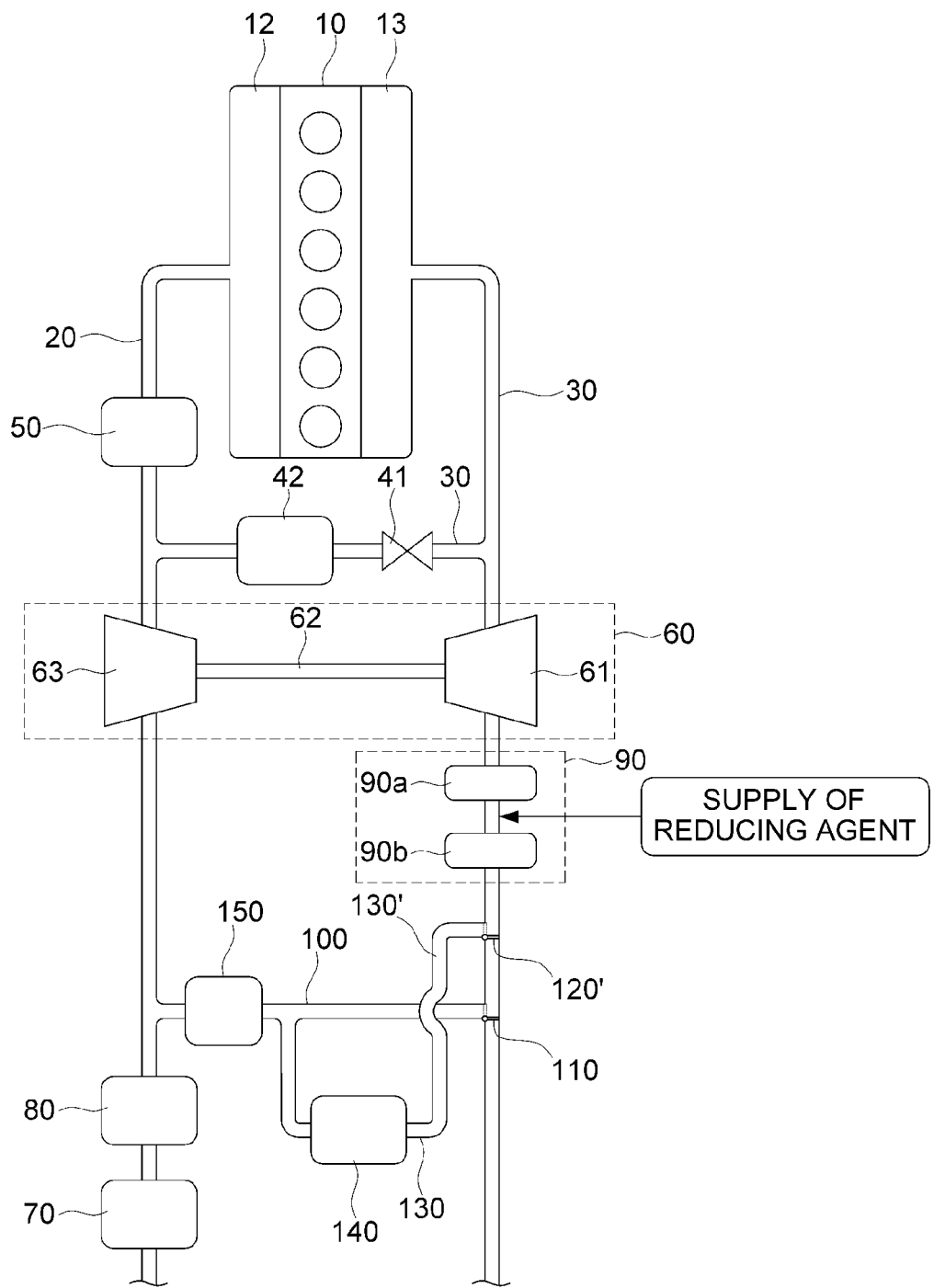
FIG. 2 is a schematic configuration diagram of an exhaust gas recirculation apparatus according to a second exemplary embodiment of the present disclosure.

FIG. 2 is a schematic configuration diagram of an exhaust gas recirculation apparatus according to a second exemplary embodiment of the present disclosure. The second exemplary embodiment of the present disclosure illustrated in FIG. 2 has a structure similar to the structure of the first exemplary embodiment of the present disclosure illustrated in FIG. 1 except for the arrangement state of the bypass line. Therefore, to help clearly understand the present disclosure, descriptions of similar and same constituent elements will be omitted hereinafter.

In the exhaust gas recirculation apparatus according to the second exemplary embodiment of the present disclosure, the suction line 20 and the exhaust line 30 are in fluid communication with the first circulation line 40 and the second circulation line 100.

The second circulation line 100 is provided with the first branch valve 110, a bypass line 130', and the AOC 140. Preferably, an upper end of the second circulation line 100 is connected to be in fluid communication with the turbine 61 at a downstream side of the post-processing unit 90, and a rear end of the second circulation line 100 is connected to be in fluid communication with the suction line 20 between the air cleaner 70 and the compressor 63, such that low-pressure exhaust gas and filtered clean air may be mixed together. The exhaust gas recirculation apparatus according to the present disclosure includes the bypass line 130' that branches off from the exhaust line 30, more specifically, from an upstream side of the second circulation line 100, and merges with the second circulation line 100. Specifically, the bypass line 130' branches off from an upstream side at a point where the second circulation line 100 branches off from the exhaust line 30, and the bypass line 130' merges with a downstream side of the second circulation line 100, and is opened and closed by means of a second branch valve 120'. That is, the recirculating exhaust gas is controlled so as to flow into one line of the second circulation line 100 and the bypass line 130' by means of the second branch valve 120'.

Optionally, the second circulation line 100 may be further provided with an EGR cooler 150 that cools the exhaust gas to be guided to the second circulation line 100, and the EGR cooler 150 may be further provided at a downstream side of a portion where the second circulation line 100 and the bypass line 130' merge together.

The ammonia slip, which is discharged to the downstream side of the SCR 90b as described above, is guided to the bypass line 130' through the second branch valve 120'. The ammonia slip is removed by being oxidized at the AOC 140 in the bypass line 130'. The exhaust gas from which the ammonia has been removed is guided and recirculated to the engine 10 through the second circulation line 100.

According to the second exemplary embodiment of the present disclosure, even though the first branch valve 110 breaks down, it is possible to supply a large amount of EGR and prevent an inflow of the ammonia slip by using the second branch valve 120'.

Figure 3:
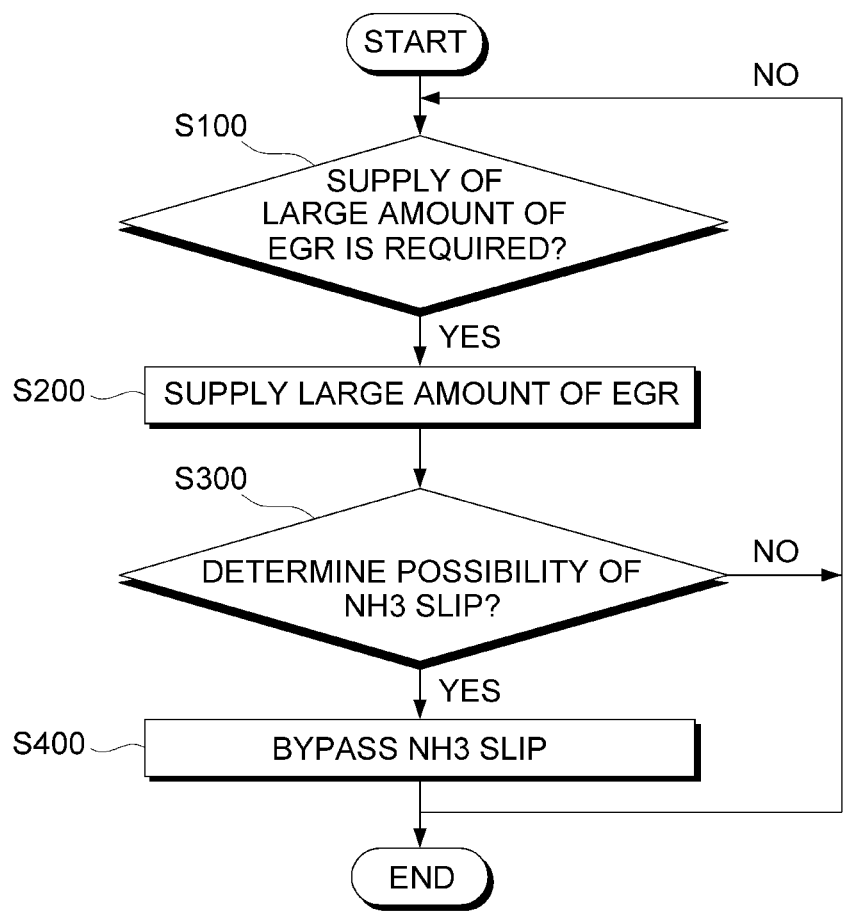
FIG. 3 is a flowchart regarding a method of controlling the exhaust gas recirculation apparatus according to the present disclosure.

FIG. 3 is a flowchart regarding a method of controlling the exhaust gas recirculation apparatus according to the present disclosure.

A method of controlling the exhaust gas recirculation apparatus according to the present disclosure includes determining supply of a large amount of EGR in the exhaust gas recirculation apparatus depending on a discharge amount of nitrogen oxide when the engine is operated (S100). Next, the method includes supplying a large amount of EGR when the supply of a large amount of EGR is required (S200). In this case, the second circulation line or LP circulation line is opened to assist recirculation of the exhaust gas. If the supply of a large amount of EGR is not required, probability of the occurrence of the ammonia slip is significantly decreased, and as a result, a normal exhaust gas recirculation process may be consistently carried out.

The method of controlling the exhaust gas recirculation apparatus according to the present disclosure includes determining possibility of the ammonia slip based on the following Equation 1 (S300) after the supplying of the large amount of EGR (S300).

Critical Value for Evaluating Occurrence of NH3
$$\text{Slip} = ((a \times X) + (b \times Y))/(c \times Z) \quad \text{[Equation 1]}$$

Here, a, b, and c are weight factors, X is a flow velocity of exhaust gas, Y is a rate of change in the occurrence of ammonia, and Z is a rate of adsorbing ammonia of the SCR carrier.

If the possibility of the ammonia slip is greater than the critical value (the critical value for evaluating the occurrence of NH3 slip) in the determining of the possibility of the ammonia slip (S300), the method includes guiding the ammonia slip to the AOC (S400). In the guiding of the ammonia slip (S400), ammonia is removed by being oxidized by means of the AOC.

Optionally, in the present disclosure, the determining of the supply of a large amount of EGR (S100) and the guiding of the ammonia slip (S400) are repeatedly carried out, thereby preventing the ammonia slip from flowing into the engine.

The exemplary embodiments of the present disclosure have been described with reference to the accompanying drawings, but those skilled in the art will understand that the present disclosure may be implemented in any other specific form without changing the technical spirit or an essential feature thereof.

Accordingly, it should be understood that the aforementioned exemplary embodiment is described for illustration in all aspects and are not limited, and the scope of the present disclosure and the detailed description shall be represented by the claims to be described below, and it should be construed that all of the changes or modified forms induced from the meaning and the scope of the claims, and an equivalent concept thereto are included in the scope of the present disclosure.

The exhaust gas recirculation apparatus for a diesel engine according to the present disclosure and the method of controlling the exhaust gas recirculation apparatus may be used to improve a rate of removal of nitrogen oxide and minimize an inflow of ammonia slip by recirculating exhaust gas in the diesel engine.

What is claimed is:

1. An internal combustion diesel engine comprising:
    a suction line which is connected to the engine to supply suctioned air;
    an exhaust line which is connected to the engine to collect exhaust gas from the engine;
    a post-processing unit which is disposed in the exhaust line to reduce hazardous substances contained in the exhaust gas;
    a first circulation line, located downstream of the post-processing unit, which guides a part of the exhaust gas, to the suction line;
    a bypass line which branches off from an upstream side of the second circulation line, and merges with a downstream side of the second circulation line; and
    an ammonia oxidation catalyst device located on the bypass line,
    wherein ammonia slip, which is discharged from the post-processing unit, is prevented from being guided to the suction line.

2. The internal combustion diesel engine of claim 1, wherein the first circulation line is in communication with the exhaust line at the downstream side of the post-processing unit and the suction line.

3. The internal combustion diesel engine of claim 1, further comprising a second circulation line which guides a part of the exhaust gas, which is guided from the exhaust line, to the suction line, upstream of the post-processing unit.

4. The internal combustion diesel engine of claim 1, wherein an EGR cooler is further disposed at a downstream side of a portion where the bypass line and the first circulation line merge together.

5. The internal combustion diesel engine of claim 1, wherein a first branch valve is provided at a portion where the first circulation line and the exhaust line merge together.

6. The internal combustion diesel engine of claim 1, wherein a second branch valve is provided at a portion where the first circulation line and the bypass line merge together.

7. The internal combustion diesel engine of claim 1, wherein the post-processing unit is provided with a selective catalytic reduction (SCR) device.

8. An internal combustion diesel engine comprising:
    a suction line which is connected to the engine to supply suctioned air;
    an exhaust line which is connected to the engine to collect exhaust gas from the engine;
    a post-processing unit which is disposed in the exhaust line to reduce hazardous substances contained in the exhaust gas;

a first circulation line, located downstream of the post-processing unit, which guides a part of the exhaust gas, to the suction line;

a bypass line which branches off from the exhaust line between the second circulation line and the post-processing unit, and merges with the second circulation line; and an ammonia oxidation catalyst device located on the bypass line, wherein ammonia slip, which is discharged from the post-processing unit, is prevented from being guided to the suction line.

9. The internal combustion diesel engine of claim 8, wherein the second circulation line is in communication with the exhaust line at the downstream side of the post-processing unit and the suction line.

10. The internal combustion diesel engine of claim 8, further comprising a second circulation line which guides a part of the exhaust gas, which is guided from the exhaust line, to the suction line, upstream of the post-processing unit.

11. The internal combustion diesel engine of claim 8, wherein an EGR cooler is further disposed at a downstream side of a portion where the bypass line and the second circulation line merge together.

12. The internal combustion diesel engine of claim 8, wherein a first branch valve is provided at a portion where the second circulation line and the exhaust line merge together.

13. The internal combustion diesel engine of claim 8, wherein a second branch valve is provided at a portion where the bypass line and the exhaust line merge together.

14. The internal combustion diesel engine of claim 8, wherein the post-processing unit is provided with a selective catalytic reduction (SCR) device.

* * * * *